US012009976B2

(12) United States Patent
Gurusiddaiah et al.

(10) Patent No.: US 12,009,976 B2
(45) Date of Patent: *Jun. 11, 2024

(54) CONFIGURATION OF A SERVER IN VIEW OF A NUMBER OF CLIENTS CONNECTED TO THE SERVER

(71) Applicant: Red Hat, Inc., Raleigh, NC (US)

(72) Inventors: Poornima Gurusiddaiah, Bangalore (IN); Amar Tumballi Suryanarayan, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,226

(22) Filed: Jun. 12, 2023

(65) Prior Publication Data
US 2023/0336416 A1    Oct. 19, 2023

Related U.S. Application Data

(63) Continuation of application No. 16/383,174, filed on Apr. 12, 2019, now Pat. No. 11,677,624.

(51) Int. Cl.
*H04L 41/082* (2022.01)
*H04L 41/12* (2022.01)
*H04L 67/01* (2022.01)
*H04L 67/568* (2022.01)

(52) U.S. Cl.
CPC ............ *H04L 41/082* (2013.01); *H04L 41/12* (2013.01); *H04L 67/568* (2022.05); *H04L 67/01* (2022.05)

(58) Field of Classification Search
CPC ... H04L 41/082; H04L 41/12; H04L 67/2842; H04L 67/42
See application file for complete search history.

(56) References Cited

U.S. PATENT DOCUMENTS

| 6,272,662 | B1 | 8/2001 | Jadav |
| 6,732,237 | B1 | 5/2004 | Jacobs |
| 6,799,251 | B1 | 9/2004 | Jacobs |
| 7,089,284 | B2 | 8/2006 | Pardikar |
| 8,352,418 | B2 | 1/2013 | Bailor |
| 8,429,753 | B2 * | 4/2013 | Skaria ................ G06F 21/6218 713/168 |

(Continued)

FOREIGN PATENT DOCUMENTS

WO    2004068469 A2    8/2004
WO    2009140953 A1    11/2009

*Primary Examiner* — Chris Parry
*Assistant Examiner* — Dixon F Dabipi
(74) *Attorney, Agent, or Firm* — Womble Bond Dickinson (US) LLP

(57) ABSTRACT

A size of a cache of a server associated with a network service is modified in view of a number of clients that are connected to the server. A cache invalidation verification operation to store data at the cache is performed in view of the number of clients that are connected to the server. A quality of service function of the server is configured in view of the number of clients that are connected to the server, wherein the quality of service function provides resources of the server to a first client accessing the network service. A module is loaded at the server in view of the number of clients that are connected to the server, wherein the module configures the network service. Access to the network service is provided by a processing device to the first client.

20 Claims, 7 Drawing Sheets

(56) References Cited

U.S. PATENT DOCUMENTS

| | | | |
|---|---|---|---|
| 8,825,594 B2 | 9/2014 | Skaria | |
| 8,892,632 B2 | 11/2014 | Knight | |
| 9,213,962 B2 * | 12/2015 | Westaway | H04L 65/4015 |
| 9,571,494 B2 * | 2/2017 | Mogaki | H04L 9/3213 |
| 10,783,081 B2 | 9/2020 | Roh | |
| 2004/0208159 A1 | 10/2004 | Jung | |
| 2004/0236777 A1 | 11/2004 | Pardikar | |
| 2005/0278642 A1 | 12/2005 | Chang | |
| 2005/0288939 A1 * | 12/2005 | Peled | G06Q 10/10 705/325 |
| 2009/0282041 A1 * | 11/2009 | Skaria | G06Q 10/10 |
| 2010/0083386 A1 * | 4/2010 | Kline | G06F 21/33 726/34 |
| 2010/0246391 A1 | 9/2010 | Immendorf | |
| 2011/0196957 A1 | 8/2011 | Ayachitula | |
| 2013/0166733 A1 | 6/2013 | Kang | |
| 2013/0246622 A1 * | 9/2013 | Iliev | G06F 9/526 709/225 |
| 2015/0106520 A1 | 4/2015 | Breitgand | |
| 2015/0178119 A1 * | 6/2015 | Lee | G06F 11/2038 718/1 |
| 2015/0193404 A1 | 7/2015 | Danziger | |
| 2016/0072886 A1 | 3/2016 | Lin | |
| 2017/0289290 A1 * | 10/2017 | Bhagwat | G06F 3/0613 |
| 2018/0132126 A1 * | 5/2018 | Yamaoka | H04L 67/568 |
| 2019/0147089 A1 | 5/2019 | Megahed | |
| 2019/0364094 A1 * | 11/2019 | Campbell | H04L 67/01 |
| 2019/0377682 A1 * | 12/2019 | Roh | G06F 12/0893 |

\* cited by examiner

CONFIGURATION OF A SERVER IN VIEW OF A NUMBER OF CLIENTS CONNECTED TO THE SERVER

RELATED APPLICATIONS

The present application is a continuation of application Ser. No. 16/383,174, filed Apr. 12, 2019, entitled "Configuration of a Server in View of a Number of Clients Connected to the Server," which is incorporated by reference herein.

TECHNICAL FIELD

Aspects of the disclosure relate generally to the configuration of a server, and more specifically, relate to the configuration of a server in view of a number of clients connected to the server.

BACKGROUND

A server may provide a network service to one or more client systems. The network service may provide a network file system that may be accessed by client systems. For example, the client systems may access the network file system by connecting to the server. Subsequently, the client systems may interact with the server to access the storage resources of the network file system. For example, the server may provide the client systems with the capability to store data at the network file system or to retrieve data that is stored at the network file system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
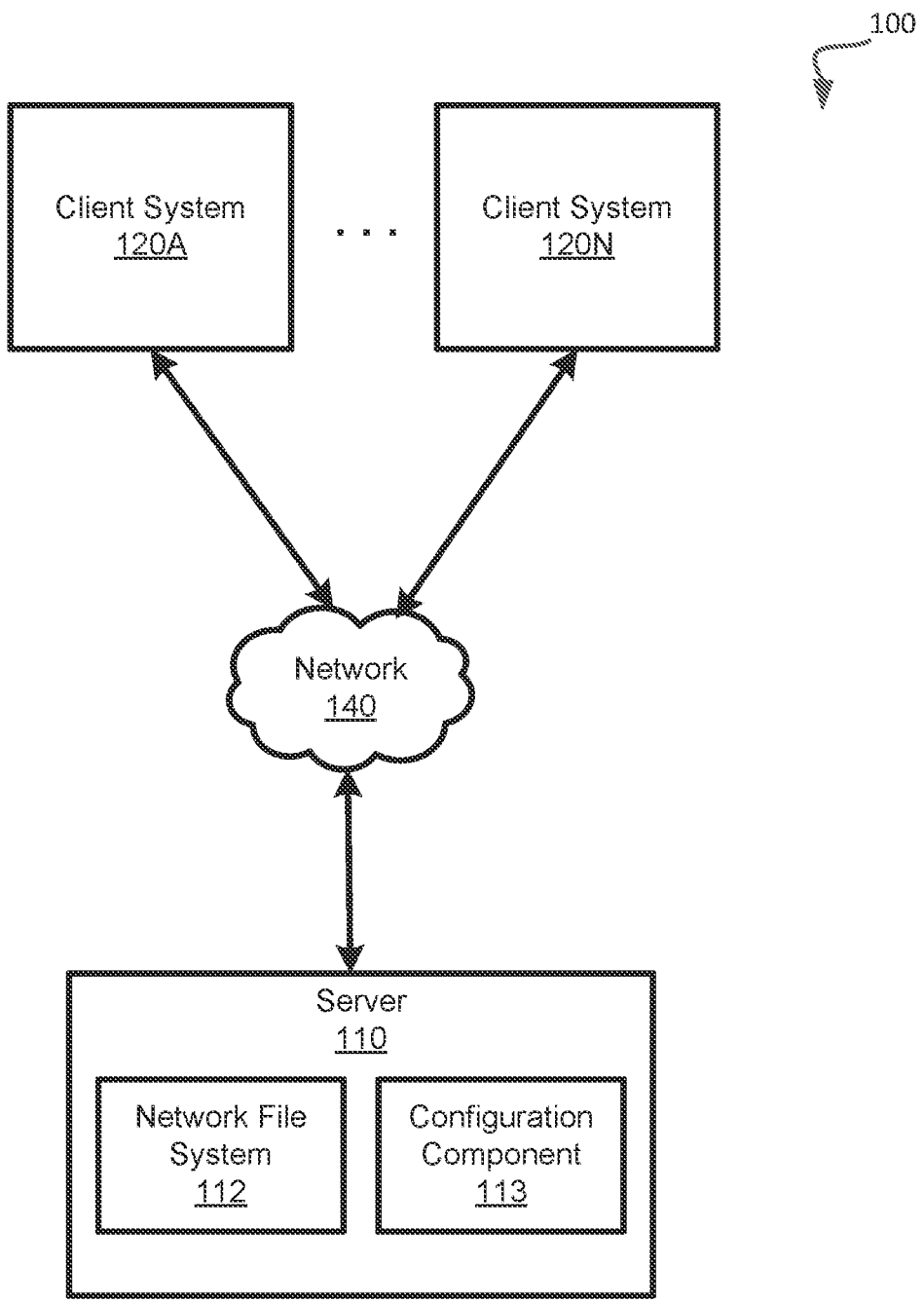
FIG. 1 illustrates an example system architecture in which embodiments of the disclosure may operate.

Aspects of the present disclosure relate to the configuring of a server system in view of a number of client systems that are connected to the server system. The server system may be a server that is used to provide a network service to various client systems. For example, the server system may provide a network file system or other such service that is to be used by the client systems. The network file system may be used to store data from the client systems as well as provide data to the client systems.

The server system may provide various different operations to support the network service. For example, to provide a network service such as a network file system, the server system may utilize various caching operations, locking operations, and quality of service operations. Caching operations may refer to operations of the server system to store data at a cache memory. Locking operations may refer to operations of the server system that restrict access to particular data of the network file system to a single client system at a single time. Furthermore, quality of service operations may refer to operations of the server system that monitor the utilization of computing resources of the server system by each client system that is connected to the server system.

The utilization of the various operations to support the network file system may change as additional client systems connect to the server system in order to access the network file system. For example, the caching operations, locking operations, and quality of service operations may function differently when a single client system is connected to the server system than when multiple client systems are connected to the server system.

However, the server system may not update the functionality of the various operations as different numbers of client systems connect to the server system. For example, the caching operations, locking operations, and quality of service operations may retain the same functionality whether a single client system is connected to the server system or multiple client systems are connected to the server system.

Aspects of the present disclosure address the above and other deficiencies by configuring a server system in view of a number of client systems that are connected to the server system. The server system may configure the caching operations, locking operations, and the quality of service operations to be optimized for a single client system when a single client system is connected to the server system. When an additional client system connects to the server system, the server system may configure the caching operations, locking operations, and the quality of service operations to be optimized for multiple client systems. Thus, the various operations of the server system that provide a network service may be updated when an additional client system connects to the server system Advantages of the present disclosure include, but are not limited to, an increase in performance of the network service that is provided by the server system. For example, the accessing of data or providing of data to a network file system may be performed in less time as the server providing access to the network file system may be optimized for the number of client systems that are currently accessing the network file system.

FIG. 1 illustrates an example system architecture 100 in which implementations of the disclosure may operate. The system architecture 100 may include a server 110 (i.e., a server system) that provides a network service such as a network file system 111. The network service may be any function that is provided by the server 110 to remote client systems. For example, the network file system 111 provided by the server 110 may store data for client systems 120 and allow clients systems 120 to access the stored data. The system architecture 100 may further include client systems 120A to 120N coupled to the server 110 via a network 140.

The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

Any number of client systems 120A to 120N may access the network file system 111 that is provided by the server 110. The client systems 120A to 120N and the server 110 may include one or more processors communicatively coupled to memory devices and input/output (I/O) devices. The client systems 120A to 120N and server 110 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

The network file system 111 may be hosted by a computer system (described in more detail below with reference to FIG. 7) and include one or more computer programs executed by the computer system for centralized management of the system architecture 100. In some implementations, the network file system 111 may be a distributed file system that includes multiple computing systems communicatively coupled to one another. The server 110 may include a configuration component 113 that may configure one or more functions or operations of the server 110 in view of or by using the number of client systems 120A to 120N that are currently accessing or connected to the network file system 111. For example, a hardware function or a software function of the server 110 may be modified or optimized in view of the number of client systems that are currently accessing data or writing data to the network file system 111. In some examples, the server 110 may be configured or optimized for a single client system when only one client system 120A to 120N is currently accessing the network file system 111. Otherwise, if multiple client systems 120A to 120N are currently accessing the network file system 111, then the server 100 may be configured or optimized for multiple client systems. Further details with respect to the configuration component 113 are described below.

Figure 2:
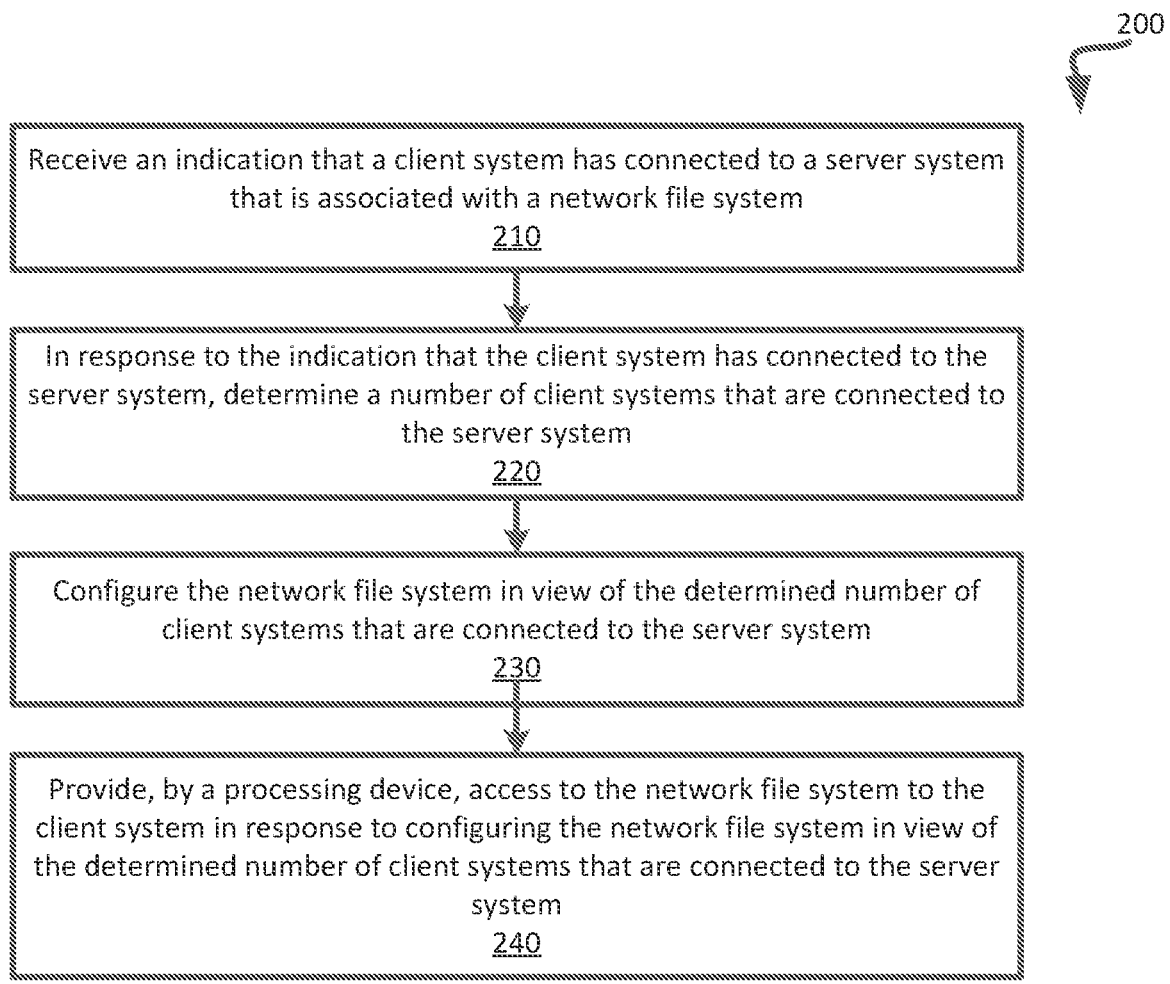
FIG. 2 is a flow diagram of an example method to provide access to a network file system in view of a number of connected client systems in accordance with some embodiments of the disclosure.

FIG. 2 is a flow diagram of an example method 200 to provide access to a network file system in view of a number of connected client systems. The method 200 may be performed by processing logic that may include hardware (e.g., processing device, circuitry, dedicated logic, programmable logic, microcode, etc.), software (e.g., instructions run or executed on a processing device), or a combination thereof. The method 200 may be performed by a configuration component 113 of a server 110 as described with regard to FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, the method 200 may begin with the processing logic receiving an identification that a client system has connected to a server system that is associated with a network file system (block 210). For example, the server system may provide access to a network service such as a network file system. The network file system may be used to store data (i.e., files) from one or more client systems as well as provide the stored data to one or more client systems of the network file system. One or more client systems may be connected with the server system to access the network file system at any given period of time. The processing logic may further determine a number of client systems that are connected to the server system in response to receiving the indication that the client has connected to the server system (block 220). For example, a number of client systems that are currently accessing the network file system via the server may be determined. The number of client systems may be client systems that are accessing the network file system as the client system has provided a request to access the network file system.

The processing logic may configure the network file system in view of the determined number of client systems that are connected to the server system (block 230). For example, certain functions or operations of the server system that are used to provide or control access to the network file system may be configured or optimized by using the number of client systems that are connected to the server system. Such functions or operations may include, but are not limited to, caching operations, locking operations, and quality of service operations. One or more of the functions or operations may be optimized for a single client system being connected to the server or multiple client systems being connected to the server.

In an example, the caching operations may correspond to storing recently accessed or written data from a client system at a cache memory of the server. The network file system may be a distributed file system and the server may include a cache memory for the distributed file system. The caching operations can be optimized for a single client system or for multiple client systems. If a single client system is accessing the server providing the network file system, then the caching operation can be considered to be more aggressive than when multiple client systems are accessing the server providing the network file system. For example, the caching operation can be used to directly store data for the single client system in the cache of the server system and data from the cache can be returned to the single client system without an additional cache invalidation verification operation. In some examples, the cache invalidation verification operation may remove or invalidate data at a cache memory if the data has been deleted or modified from the network file system. In the case of a single client system, since the network file system is only currently being accessed by a single client system, then no other client systems may invalidate certain data stored at the cache memory by modifying or deleting data stored at the network file system. Thus, when a single client system is accessing the network file system, the data in the cache memory of the server system may only be invalidated by the single client system as opposed to the single client system and additional client systems. Thus, the caching operation are optimized to utilize the cache without verifying whether other client systems have invalidated data currently stored at the cache memory. Furthermore, since a single client system is accessing the network file system, the cache memory of the server system can be allocated a smaller storage capacity than when more client systems are accessing the network file system.

The locking operations may correspond to a restriction of data that is being accessed by a client system. For example, the locking operations may lock or allow a particular client system to access particular data (i.e., a specific file or a portion of a file) of the network file system while not allowing other client systems to access the particular data while the particular client system is accessing (i.e., reading or writing to) the particular data or while the data is locked by the particular client system. If a single client system is accessing the network file system, then the locking operations can be considered to be more lenient than when multiple client systems are accessing the network file system. In some examples, when a single client system is accessing the network file system, a lock can be provided or granted without a verification when the single client system requests the lock. For example, since no other client systems are connected to the server system, a verification of whether another client system is currently accessing or previously requested a lock for the same data may not be performed. The server system may store a data structure that identifies each active or presently used lock on data of the network file system. The data structure may thus identify data stored at the network file system and whether an active lock is present on the data. When multiple client systems are connected to the server system and one of the client systems requests a lock on a particular data file, the server system may perform the locking operation by retrieving the data structure, finding the particular data file within the data structure, and determining whether another client system has currently locked the particular data file. Otherwise, if a single client system is currently accessing the server system, then the locking operation may automatically provide the lock to the single client system when requested as opposed to verifying whether a lock is present on the corresponding requested data.

In an example, the quality of service operations may correspond to the monitoring of resources of the server system. For example, the quality of service operations may be used to monitor the utilization of the resources of the server system between one or more client systems. For the quality of service operations may include various checks or monitoring operations of different resources of the server system. Such resources may include, but are not limited to, the network bandwidth of the server system, the processing utilization of the server system, the scheduling or queuing of read operations and write operations from client systems, etc. The quality of service operations may be used to monitor such resources of the server system and to ensure that the resources are being separated between the different client systems. For example, the quality of service operations may be used to ensure that the performance of the network file system satisfies a threshold quality (e.g., latency performance or other such indicator) for each client system that is accessing the network file system. If a single client system is accessing the network file system, then the quality of service operations may not be utilized as the resources of the server system are only being utilized by one client system. Otherwise, if multiple client systems are accessing the network file system, then the quality of service operations may be utilized to monitor the resources of the server system between the different client systems.

Figure 3:
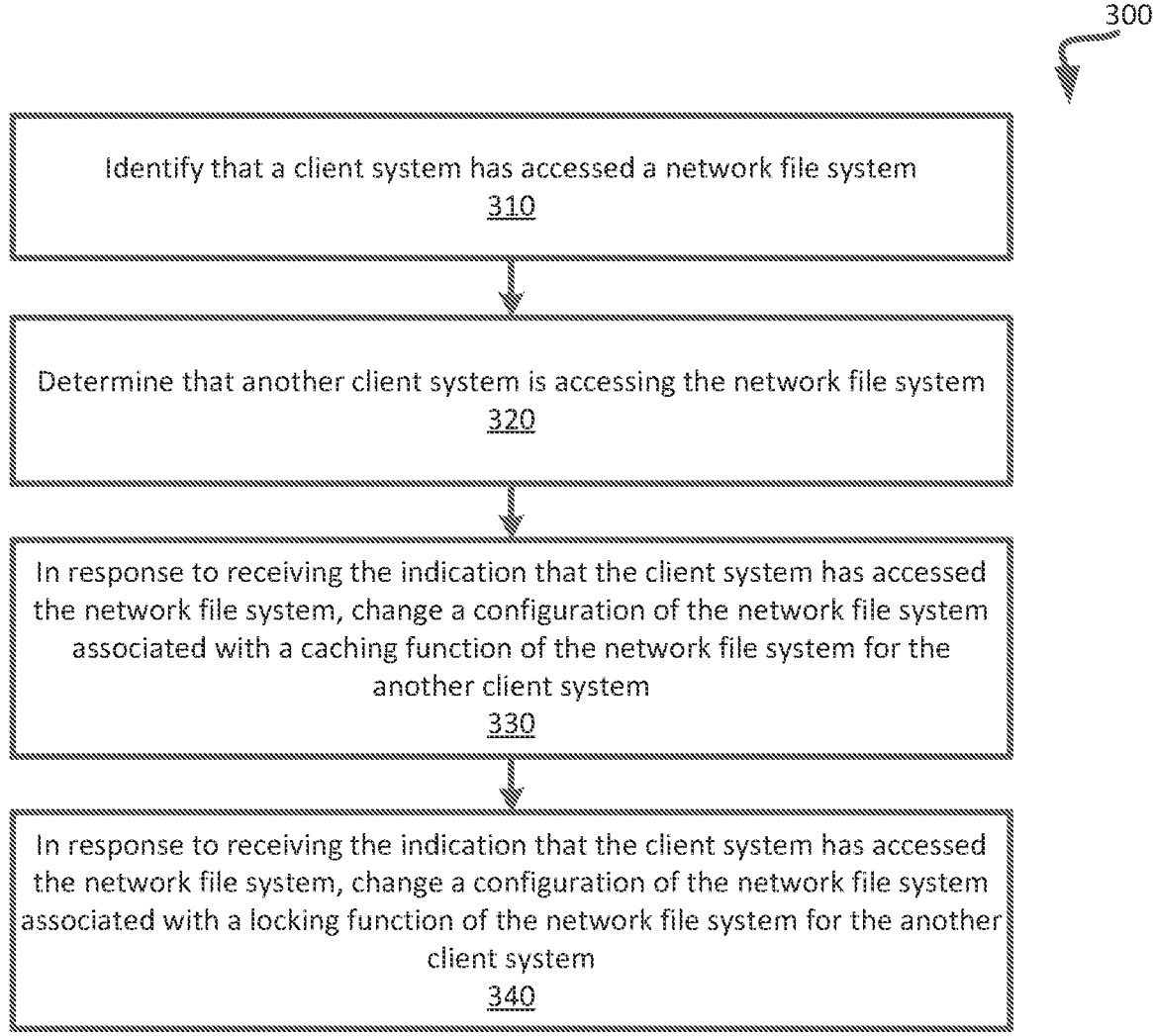
FIG. 3 is a flow diagram of an example method to change a configuration of a network file system in accordance with some embodiments of the disclosure.

Referring to FIG. 2, the processing logic may provide access to the network file system to the client system in response to configuring the network file system in view of the determined number of client systems that are connected to the server system (block 240). For example, the various operations or functions of the network file system may be optimized for a single client system if the client system is the only client system that is to access the network file system. Otherwise, the various operations or functions of the network file system may be optimized for multiple client systems if the client system is not the only client system that is to access the network file system FIG. 3 is a flow diagram of an example method 300 to change a configuration of a network file system in accordance with some embodiments of the disclosure. The method 300 may be performed by processing logic that may include hardware (e.g., processing device, circuitry, dedicated logic, programmable logic, microcode, etc.), software (e.g., instructions run or executed on a processing device), or a combination thereof. The method 300 may be performed by a configuration component 113 of a server 110 as described with regard to FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 3, the method 300 may begin with the processing logic identifying that a client system has accessed a network file system (block 310). For example, the client system may initially connect to the network file system to access data stored at the network file system or to provide data to be stored at the network file system. The processing logic may determine that another client system is accessed the network file system (block 320). For example, the other client system may have previously connected to the network file system and may currently be accessing the network file system. In response to receiving the indication that the client system has accessed the network file system, the processing logic may change a configuration of the network file system associated with a caching function of the network file system for the another client system (block 330). For example, the other client system may have been the only client system accessing the network file system until the identified client system has connected with the network file system. The caching operations may thus be changed to be less aggressive and/or the size of the cache memory may be increased as a result of multiple client systems now accessing the network file system. As such, the caching operations for the single client system that was previously connected to the network file system may be changed or modified while the single client system has been accessing the network file system. In some examples, the client system may be notified that the additional client system has connected with the network file system.

The processing logic may further change a configuration of the network file system associated with a locking function of the network file system for the another client system in response to receiving the indication that the client system has accessed the network file system (block 340). For example, the locking operations may be changed from not verifying any locks from other client systems to verifying whether another lock is present when a request to lock particular data is received from a client system. In some examples, the quality of service operations may further be changed. For example, the quality of service operations may be initiated or may begin when the client system has accessed the network file system.

Figure 4:
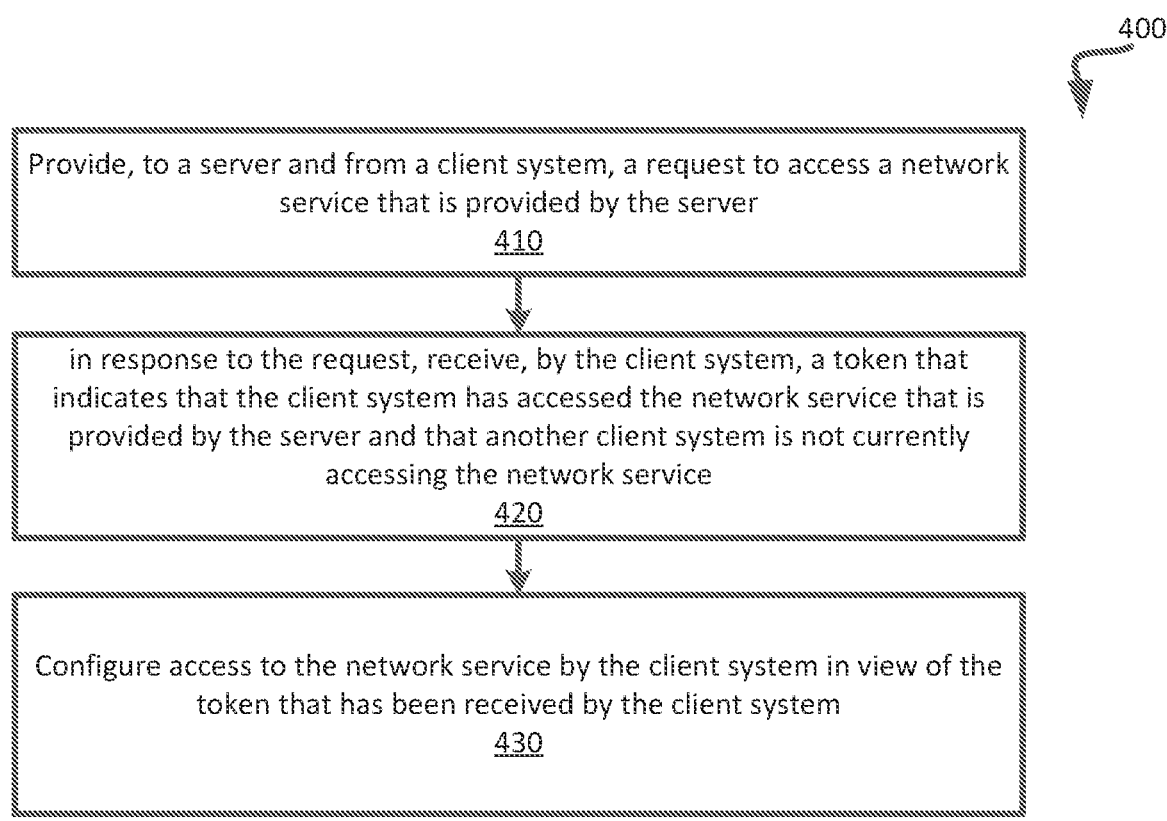
FIG. 4 is a flow diagram of an example method to configure access to a network service in view of a token in accordance with some embodiments of the disclosure.

FIG. 4 is a flow diagram of an example method 400 to configure access to a network service in view of a token in accordance with some embodiments of the disclosure. The method 400 may be performed by processing logic that may include hardware (e.g., processing device, circuitry, dedicated logic, programmable logic, microcode, etc.), software (e.g., instructions run or executed on a processing device), or a combination thereof. The method 400 may be performed by a configuration component 113 of a server 110 as described with regard to FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel.

Additionally, one or more processes can be omitted in various embodiments. Thus, not all processes are required in every embodiment. Other process flows are possible.

As shown in FIG. 4, the method 400 may begin with the processing logic providing, to a server and from a client system, a request to access a network service that is provided by the server (block 410). For example, the client system may transmit a request to access a network file system that is provided by the server. The processing logic may, in response to the request, receive, by the client system, a token that indicates that the client system has accessed the network service that is provided by the server and that another client system is not currently accessing the network service (block 420). For example, the token may specify that the client system is the only client system that is currently accessing the network service. Furthermore, the token may specify that the server providing the network service is operating in a single client mode. For example, the token may specify that various functions or operations (e.g., the caching operation, locking operation, and quality of service operation) are configured to operate with a single client system. Thus, the token may be received when no other client system is accessing the network service when the client system has provided a request to access the network service.

The processing logic may further configure access to the network service by the client system in view of the token that has been received by the client system (block 430). For example, certain operations of the client system may be configured to operate with the network service that has been configured to operate in a single client mode. In some examples, the transmitting of data from the client system to the network file system may be in view of the token. For example, the rate at which data is transmitted from the client system to the network service may be increased when the client system is the only client system accessing the network service. In some embodiments, data from the client system may be aggregated and transmitted to the network service in larger sizes.

Otherwise, if the token is not received then the client system can operate as if the network service is configured to operate in a multiple client mode where two or more client systems are accessing the network service. For example, the rate at which data is transmitted from the client system may be reduced and data may not be aggregated in larger sizes when being transmitted from the client system to the network service.

In some examples, the token may be invalidated by the server system. For example, the token may be received by the client system when the client system is the only client system accessing the network service provided by the server system. If an additional client system connects to and accesses the network service, then the server system may provide an indication that the token is invalidated and the client system may reconfigure operations from a single client mode to a multiple client mode.

Figure 5:
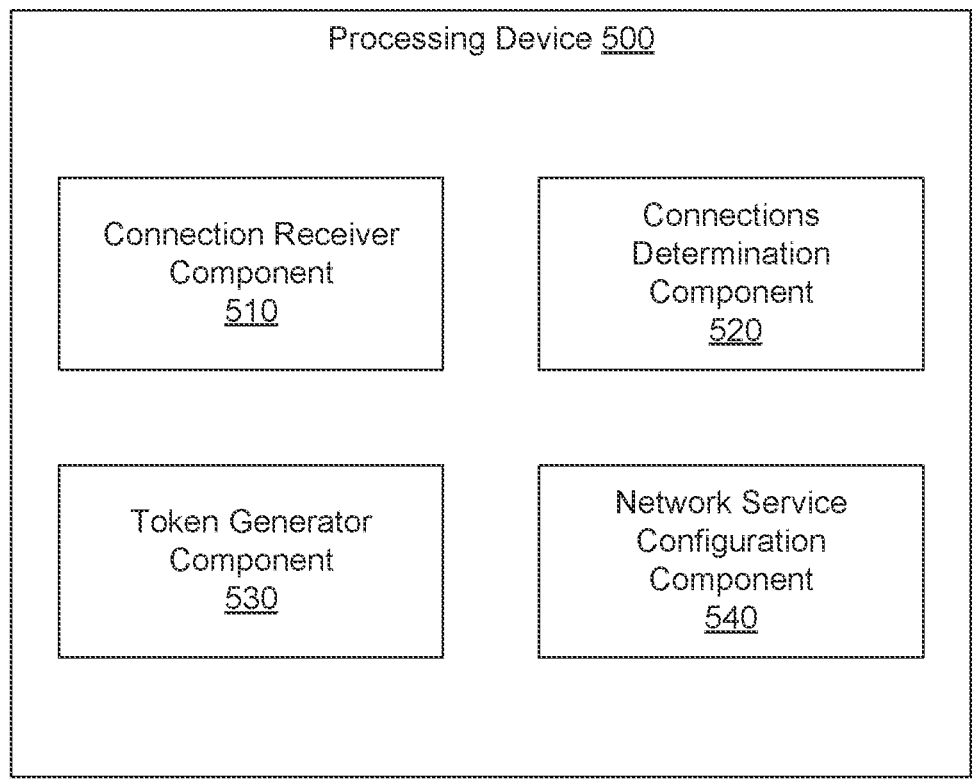
FIG. 5 illustrates an example apparatus in which implementations of the disclosure may operate in accordance with one or more aspects of the present disclosure.

FIG. 5 illustrates an example apparatus in which implementations of the disclosure may operate. The apparatus may be included in a server 110 of FIG. 1.

As shown, the apparatus may include a processing device 500. The processing device 500 may include one or more components. For example, the processing device 500 may include or may be executed to perform the various components. Such components may correspond to sub-components of the configuration component 113. The components may include a connection receiver component 510, a connections determination component 520, a token generator component 530, and a network service configuration component 540.

The connection receiver component 510 may receive an indication that a client system has connected to a server system to access a network service. The connections determination component 520 may determine a number of client systems that are connected to the server system or are accessing the network service. For example, the connections determination component 520 may determine whether one client system is connected to the server system or whether multiple client systems are connected to the server system. The token hibernator component 530 may generate a token to be provided to a client system. The token may be generated when the client system is the only client system accessing the server system. The token may be transmitted to the client system over a network. Furthermore, the network service configuration component 540 may configure the network service in view of the token. For example, when the token is issued to the client system, the network service configuration component may configure functions or operations of the server system as previously described. In some examples, the configuration of the functions or operations may correspond to a configuration of access control functions of the server system. Such access control functions may be used by client systems to access the network service provided by the server. In some examples, as previously described, the server system may be configured in view of the number of client systems that are connected to the server system. The configuring of the server system may correspond to a loading of particular software modules or software code that provides the functionality or operations of the configuration.

Figure 6:
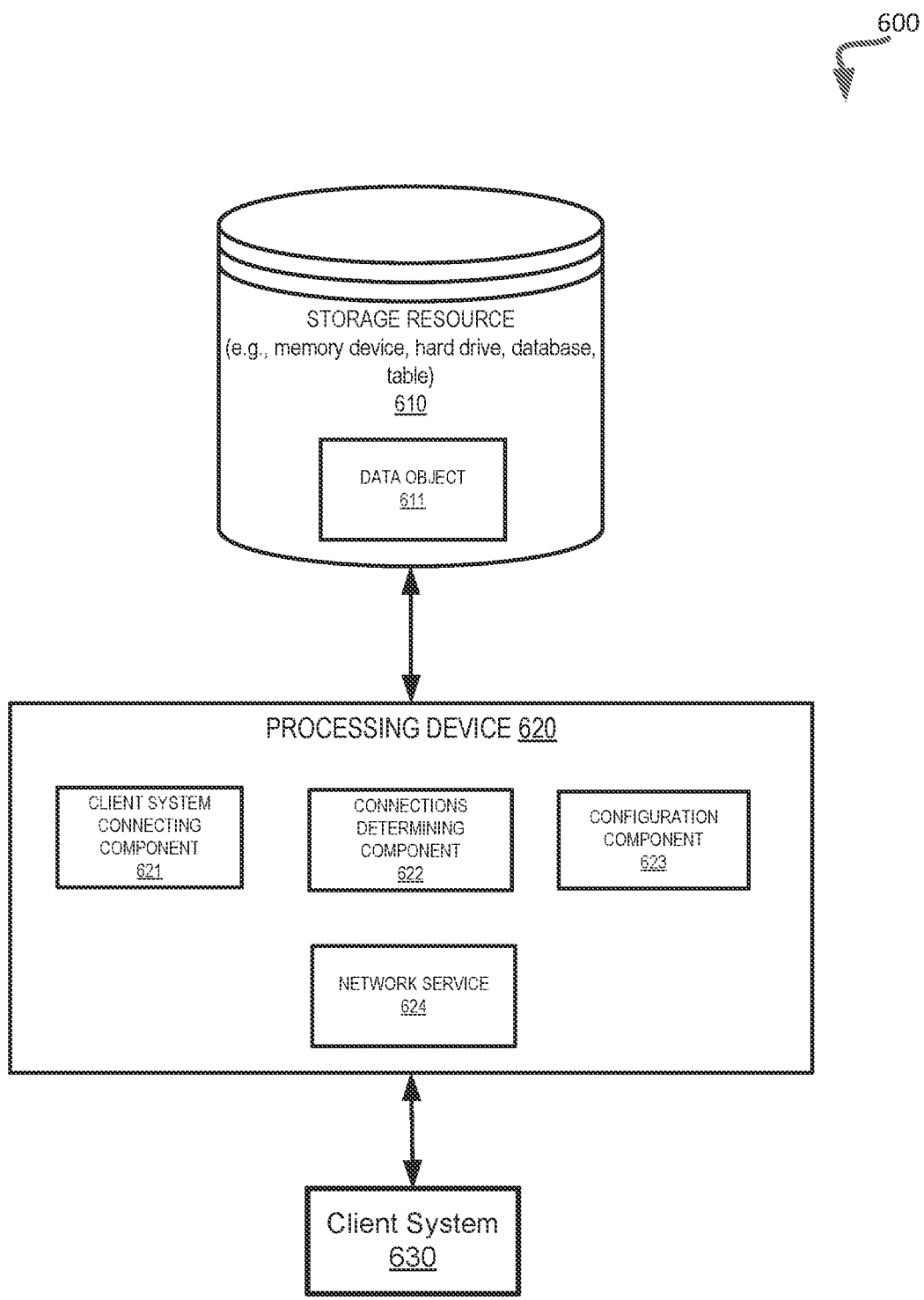
FIG. 6 illustrates an example apparatus in which implementations of the disclosure may operate in accordance with one or more aspects of the present disclosure.

FIG. 6 illustrates an example apparatus 600 in which implementations of the disclosure may operate. The apparatus 600 may be the same or similar to one of the distributed computing system, a network, or other computing devices. The data store 610 may include any non-persistent data storage (e.g., memory), persistent data storage (e.g., flash storage, hard drive, tape), another medium, or combination thereof that is capable of storing instructions for carrying out the operations of the components discussed herein. Furthermore, the data store 610 may store information such as a data object 611 of a network file system.

The apparatus 600 may include a processing device 620. The processing device 620 may include a client system connection component 621, a connections determining component 622, and a configuration component 623. Furthermore, the processing device 620 may provide or execute a network service 624.

The client system connecting component 621 may identify whether a new client system has connected to the network service 624. For example, the client system connecting component 621 may receive an indication that the client system 630 has connected with the network service 624. The connections determining component 622 may determine a number of total client systems that are connected with the network service. For example, a determination may be made as to whether the client system 630 is the only client system connected with the network service 624 or if another client system is also connected with the network service 624. The configuration component may subsequently configure the network service 624. For example, the caching operations, locking operations, and quality of service operations may be configured or optimized in view of the total number of client systems that are connected with the network service 624.

Figure 7:
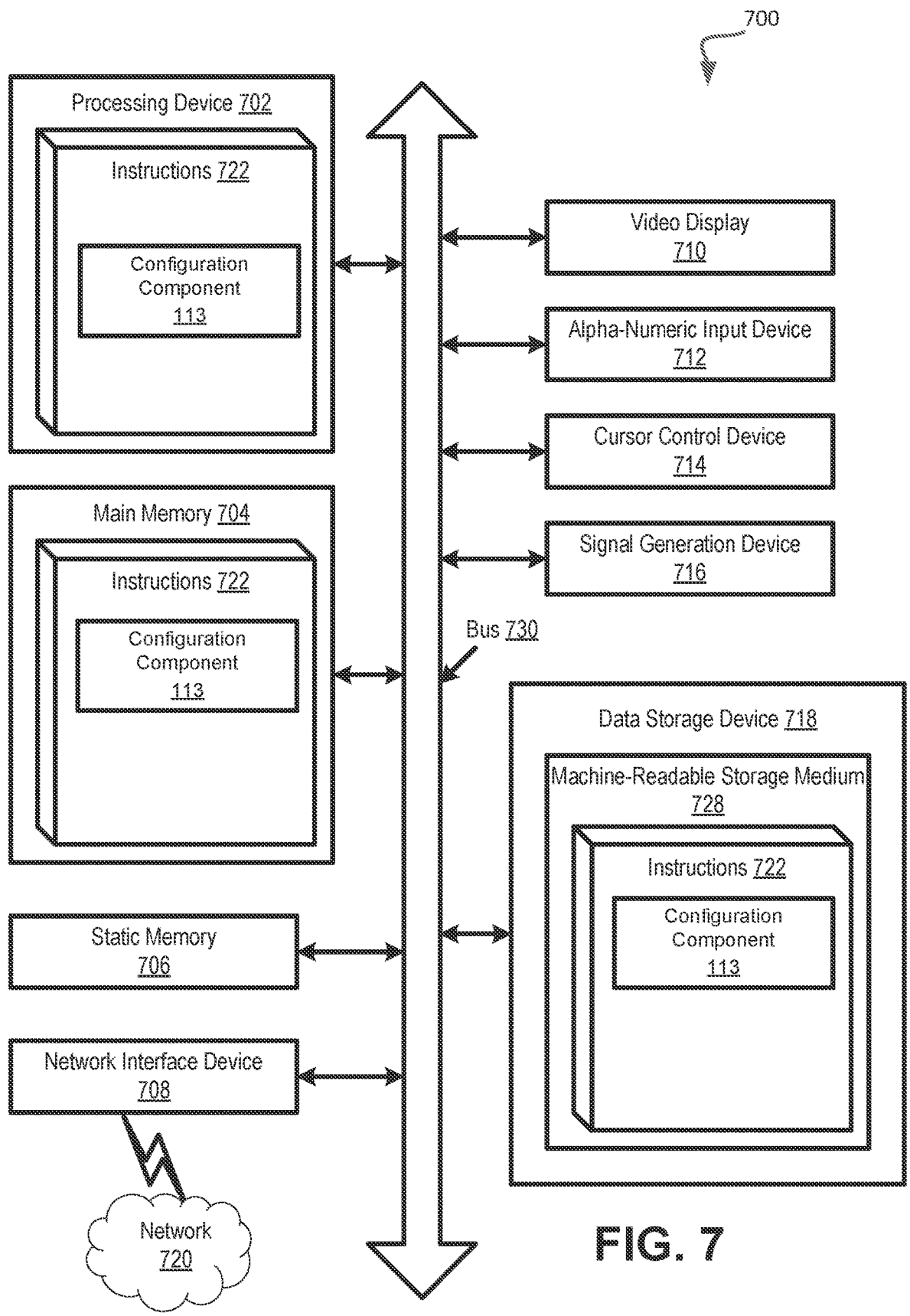
FIG. 7 illustrates a block diagram of an embodiment of a computer system in which some embodiments of the disclosure may operate.

FIG. 7 illustrates a block diagram of a machine in an example embodiment of a computer system 700 in which some embodiments of the disclosure may operate. In some embodiments, the computer system 700 or machine may contain a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic for performing the operations and steps discussed herein.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 728 on which is stored software embodying any one or more of the methodologies of functions described herein. The software may also reside, completely or at least partially, within the main memory 704 as instructions 722 and/or within the processing device 702 as processing logic during execution thereof by the computer system 700, the main memory 704 and the processing device 702 also constituting machine-accessible storage media.

The machine-readable storage medium 728 may also be used to store instructions 722 to implement a configuration component 113, and/or a software library containing methods that call the above applications. While the machine-accessible storage medium 728 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "accessing", "parsing", "locating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

Example 1 is a method comprising receiving an indication that a client system has connected to a server system that is associated with a network file system, in response to the indication that the client system has connected to the server system, determining a number of client systems that are connected to the server system, configuring the network file system in view of the determined number of client systems that are connected to the server system, and providing, by a processing device, access to the network file system to the client system in response to configuring the network file system in view of the determined number of client systems that are connected to the server system.

Example 2 is the method of Example 1, wherein configuring the network file system in view of the determined number of client systems corresponds to configuring functionality of the network file system for a single client mode in response to the number of clients being a single client system, and wherein the functionality of the network file system is configured to a multiple client mode in response to the number of clients being two or more client systems. 3

Example 3 is the method of Example 1, wherein configuring the network file system comprises configuring a caching function of the server system that is associated with the network file system.

Example 4 is the method of Example 1, wherein configuring the network file system comprises configuring a locking function of the server system that is associated with the network file system, wherein the locking function corresponds to a verification of whether the client system can access a particular data stored at the network file system at a particular time.

Example 5 is the method of Example 4, wherein the verification of the locking function corresponds to an increased verification operation in response to the number of client systems being two or more client systems relative to the verification operation in response to the number of client systems being a single client system.

Example 6 is the method of Example 1, wherein configuring the network file system comprises configuring a quality of service function of the server system that is associated with the network file system, wherein the quality of service function corresponds to providing resources of the server system to one or more client systems that are accessing the network file system.

Example 7 is the method of Example 1, wherein configuring the network file system comprises loading a module at the server system in view of the determined number of client systems that are connected to the server system, wherein the module provides a functionality of the network file system.

Example 8 is a system comprising a memory and a processing device, operatively coupled with the memory, to identify that a client system has accessed a network file system, determine that another client system is currently accessing the network file system, in response to receiving the indication that the client system has accessed the network file system, change a configuration of the network file system associated with a caching function of the network file system for the another client system and change a configuration of the network file system associated with a locking function of the network file system for the another client system.

Example 9 is the system of Example 8, wherein the caching function corresponds to the storing of data from the another client system at a cache memory of a server associated with the network file system.

Example 10 is the system of Example 8, wherein the locking function corresponds to a verification of whether the another client system can access a particular data stored at the network file system.

Example 11 is the system of Example 8, wherein the changing of the locking function corresponds to a initiating a verification operation of whether a particular data can be accessed by the another client system, the verification operation determining whether the particular data is associated with a lock for any client system.

Example 12 is the system of Example 8, wherein the processing device is further to in response to receiving the indication that the client system has accessed the network file system, change a configuration of the network file system associated with a quality of service function of the network file system for the another client system.

Example 13 is the system of Example 12, wherein the quality of service function corresponds to a monitoring of resources of a server system providing the network file system.

Example 14 is the system of Example 12, wherein the quality of service function corresponds to an initiating of the monitoring of the resources of the server system providing the network file system in response to the indication that the client system has accessed the network file system.

Example 15 is a non-transitory computer readable medium comprising instructions, which when accessed by a processing device, cause the processing device to provide, to a server and from a client system, a request to access a network service that is provided by the server, in response to the request, receive, by the client system, a token that indicates that the client system has accessed the network service that is provided by the server and that another client system is not currently accessing the network service, and configure access to the network service by the client system in view of the token that has been received by the client system.

Example 16 is the non-transitory computer readable medium of Example 15, wherein the token further indicates that the server is operating a single client mode.

Example 17 is the non-transitory computer readable medium of Example 16, wherein the single client mode corresponds to the client system being the only client system accessing the network service.

Example 18 is the non-transitory computer readable medium of Example 15, wherein configuring the access to the network service by the client system corresponds to transmitting data from the client system to the server in view of the token.

Example 19 is the non-transitory computer readable medium of Example 15, wherein the processing device is further to receive an indication that the token has been invalidated by the server, wherein the invalidation of the token is associated with an additional client system requesting to access the network service that is provided by the server.

Example 20 is the non-transitory computer readable medium of Example 19, wherein the processing device is further to in response to receiving the indication that the token has been invalidated by the server, configuring the access to the service network by the client system in view of the indication that the token has been invalidated.

Example 21 is the non-transitory computer readable medium of Example 20, wherein configuring the access to the service network by the client system in view of the indication that the token has been invalidated corresponds to a changing of transmitting of data from the client system to the server.

Example 22 is a method comprising receiving, by a processing device of a server and from a client system, a request to access a network service that is provided by the server; in response to the request, determining whether another client system is currently accessing the network service that is provided by the server, providing a token to the client system in response to determining that another client system is not currently accessing the network service that is provided by the server, wherein the token indicates to the client system that another client system is not currently accessing the network service that is provided by the server, and configuring an access control function of the network service in response to providing the token to the client system.

Example 23 is the method of Example 22, wherein the access control function corresponds to a caching operation of the server.

Example 24 is the method of Example 22, wherein the access control function corresponds to a locking operation of the server.

Example 25 is the method of Example 22, wherein the access control function corresponds to a quality of service operation of the server.

Example 26 is the method of Example 22, wherein the configuring of the access control function corresponds to a single client mode.

Example 27 is the method of Example 22, further comprising receiving an indication that the another client system has provided a request to access the network service, and in response to receiving the indication, providing an indication that the token provided to the client system has been invalidated.

Example 28 is the method of Example 27, further comprising configuring the access control function of the network service to another mode in response to the indication that the token has been invalidated.

Example 29 is the method of Example 28, wherein the configuring of the access control function to another mode corresponds to changing the access control function from a single client system mode to a multiple client system mode.

Example 30 is an apparatus comprising means for receiving an indication that a client system has connected to a server system that is associated with a network file system, means for determining, in response to the indication that the client system has connected to the server system, a number of client systems that are connected to the server system, means for configuring the network file system in view of the determined number of client systems that are connected to the server system, and means for providing access to the network file system to the client system in response to configuring the network file system in view of the determined number of client systems that are connected to the server system.

What is claimed is:

1. A method comprising:
receiving an indication that a first client has connected to a server that is associated with a network service;
in response to the indication that the first client has connected to the server, determining that multiple clients are connected to the server;
modifying, in view of the multiple clients that are connected to the server associated with the network service, a size of a cache of the server;
performing, in view of the multiple clients that are connected to the server, a cache invalidation verification operation to store data at the cache;
configuring, in view of the multiple clients that are connected to the server, a quality of service function of the server, wherein the quality of service function provides resources of the server to the first client accessing the network service;
loading, in view of the multiple clients that are connected to the server, a module at the server, wherein the module configures the network service;
retrieving, in view of the multiple clients that are connected to the server, a data structure comprising one or more locks;
determining, using the data structure, that the one or more locks is not associated with a particular data stored at the network service; and
in response to determining that the one or more locks is not associated with the particular data stored at the network service, providing, by a processing device, access to the particular data stored at the network service to the first client.

2. The method of claim 1, further comprising:
receiving an indication that the first client has connected to the server associated with the network service.

3. The method of claim 1, further comprising:
   determining a number of clients that are connected to the server; and
   configuring functionality of the network service for a single client mode in response to the number of clients being a single client, and wherein the functionality of the network service is configured to a multiple client mode in response to the number of clients being two or more clients.

4. The method of claim 3, wherein the cache invalidation verification operation is used as part of a caching function of the server associated with the network service responsive to the number of the clients exceeding a single client.

5. The method of claim 4, further comprising:
   configuring a locking function of the server that is associated with the network service, wherein the locking function corresponds to a verification of whether the first client can access the particular data stored at the network service at a particular time.

6. The method of claim 5, wherein the verification of the locking function corresponds to an increased verification operation in response to the number of clients being two or more clients relative to the verification operation in response to the number of clients being a single client.

7. The method of claim 1, further comprising:
   changing a configuration of the network service associated with a caching function of the network service for the first client.

8. A system comprising:
   a memory; and
   a processing device, operatively coupled with the memory, to:
   receiving an indication that a first client has connected to a server that is associated with a network service;
   in response to the indication that the first client has connected to the server, determining that multiple clients are connected to the server;
   modify, in view of the multiple clients that are connected to the server associated with the network service, a size of a cache of the server;
   perform, in view of the multiple clients that are connected to the server, a cache invalidation verification operation to store data at the cache;
   configure, in view of the multiple clients that are connected to the server, a quality of service function of the server, wherein the quality of service function provides resources of the server to the first client accessing the network service;
   load, in view of the multiple clients that are connected to the server, a module at the server, wherein the module configures the network service;
   retrieve, in view of the multiple clients that are connected to the server, a data structure comprising one or more locks;
   determine, using the data structure, that the one or more locks is not associated with a particular data stored at the network service; and
   in response to determining that the one or more locks is not associated with the particular data stored at the network service, provide access to the particular data stored at the network service to the first client.

9. The system of claim 8, wherein the processing device is further to:
   receive an indication that the first client has connected to the server associated with the network service.

10. The system of claim 8, wherein the processing device is further to:
    determine a number of clients that are connected to the server; and
    configure functionality of the network service for a single client mode in response to the number of clients being a single client, and wherein the functionality of the network service is configured to a multiple client mode in response to the number of clients being two or more clients.

11. The system of claim 10, wherein the cache invalidation verification operation is used as part of a caching function of the server associated with the network service responsive to the number of the clients exceeding a single client.

12. The system of claim 10, wherein the processing device is further to:
    configure a locking function of the server that is associated with the network service, wherein the locking function corresponds to a verification of whether the first client can access the particular data stored at the network service at a particular time.

13. The system of claim 12, wherein the verification of the locking function corresponds to an increased verification operation in response to the number of clients being two or more clients relative to the verification operation in response to the number of clients being a single client.

14. The system of claim 8, wherein the processing device is further to:
    change a configuration of the network service associated with a caching function of the network service for the first client.

15. A non-transitory computer readable medium comprising instructions, which when accessed by a processing device, cause the processing device to:
    receive an indication that a first client has connected to a server that is associated with a network service;
    in response to the indication that the first client has connected to the server, determine that multiple clients are connected to the server;
    modify, in view of the multiple clients that are connected to the server associated with the network service, a size of a cache of the server;
    perform, in view of the multiple clients that are connected to the server, a cache invalidation verification operation to store data at the cache;
    configure, in view of the multiple clients that are connected to the server, a quality of service function of the server, wherein the quality of service function provides resources of the server to the first client accessing the network service;
    load, in view of the multiple clients that are connected to the server, a module at the server, wherein the module configures the network service;
    retrieve, in view of the multiple clients that are connected to the server, a data structure comprising one or more locks;
    determine, using the data structure, that the one or more locks is not associated with a particular data stored at the network service; and
    in response to determining that the one or more locks is not associated with the particular data stored at the network service, provide access to the particular data stored at the network service to the first client.

16. The non-transitory computer readable medium of claim 15, wherein the processing device is further to:
    receive an indication that the first client has connected to the server associated with the network service.

17. The non-transitory computer readable medium of claim 15, wherein the processing device is further to:
  determine a number of clients that are connected to the server; and
  configure functionality of the network service for a single client mode in response to the number of clients being a single client, and wherein the functionality of the network service is configured to a multiple client mode in response to the number of clients being two or more clients.

18. The non-transitory computer readable medium of claim 17, wherein the cache invalidation verification operation is used as part of a caching function of the server associated with the network service responsive to the number of the clients exceeding a single client.

19. The non-transitory computer readable medium of claim 17, wherein the processing device is further to:
  configure a locking function of the server that is associated with the network service, wherein the locking function corresponds to a verification of whether the first client can access the particular data stored at the network service at a particular time.

20. The non-transitory computer readable medium of claim 19, wherein the verification of the locking function corresponds to an increased verification operation in response to the number of clients being two or more clients relative to the verification operation in response to the number of clients being a single client.

* * * * *